March 31, 1970   M. B. HERRIN ET AL   3,503,147
DISPLAY DEVICES

Filed March 4, 1968   2 Sheets-Sheet 1

INVENTORS
MELVIN B. HERRIN
LENARD H. HERRIN

BY

ATTORNEYS

March 31, 1970 M. B. HERRIN ET AL 3,503,147
DISPLAY DEVICES
Filed March 4, 1968 2 Sheets-Sheet 2
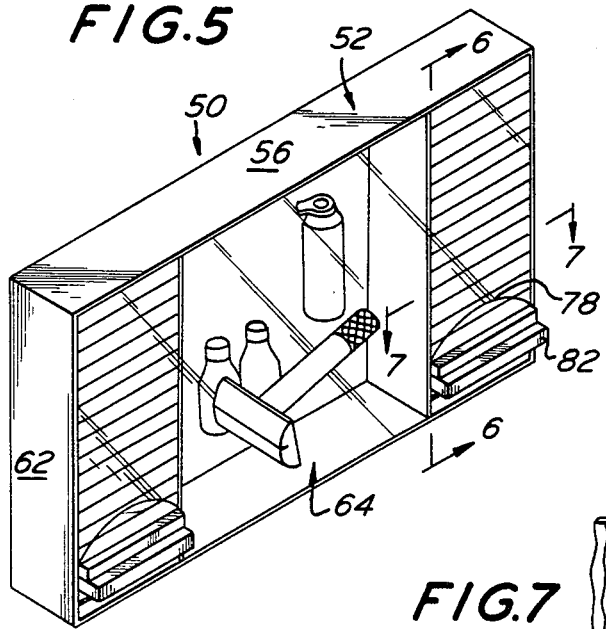
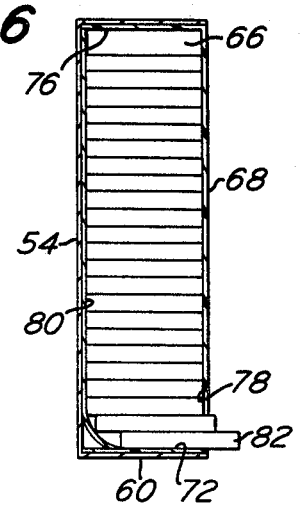
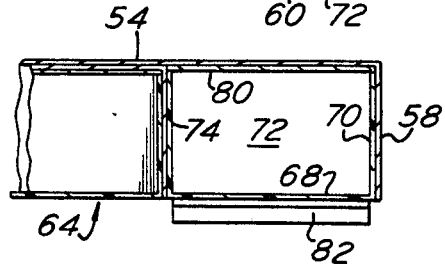
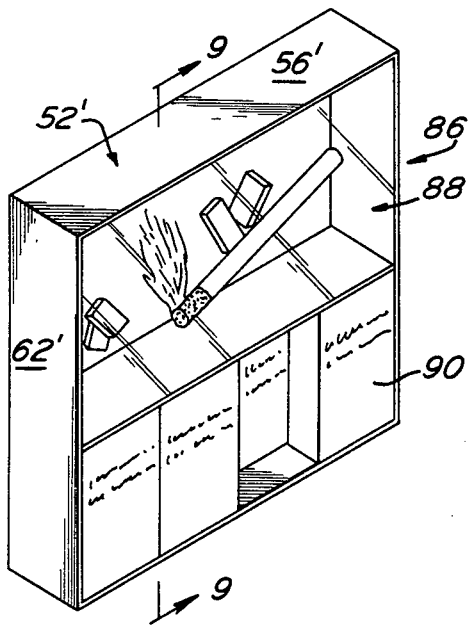
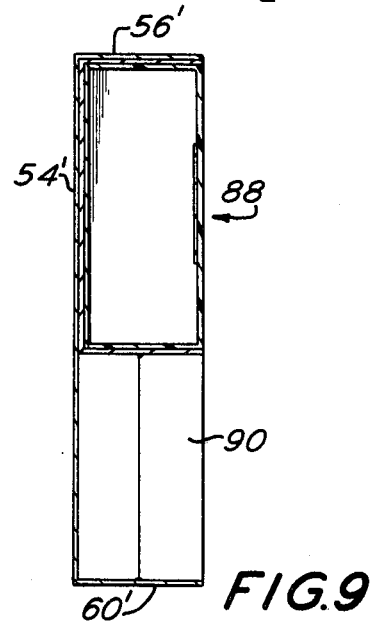
INVENTORS
MELVIN B. HERRIN
LENARD H. HERRIN
BY
ATTORNEYS United States Patent Office 3,503,147
Patented Mar. 31, 1970

3,503,147
DISPLAY DEVICES
Melvin B. Herrin and Lenard H. Herrin, both of 15th and
Huntingdon Sts., Philadelphia, Pa.
Filed Mar. 4, 1968, Ser. No. 710,065
Int. Cl. G09f 1/00, 1/12
U.S. Cl. 40—124.1
7 Claims

ABSTRACT OF THE DISCLOSURE

Display devices are presented wherein the device comprises an opaque rear member telescopically coupled to a transparent front member. Indicia is provided on a portion of the face of the transparent member and indicia is provided on the rear member so it can be visible through the transparent member. The indicia on each member are preferably related or compatible with one another so that together they present an organized display which may be utilized for advertising purposes. The said display devices may be supported by a dispenser housing which also contains at least one compartment into which will be placed articles to be dispensed. The indicia on each of the front and rear members of the display device is preferably coordinated with the articles to be dispensed.

---

This invention is directed to display devices, more particularly to display devices which are attractive and may be utilized for advertising products, solicitation of funds, display of art works which can be mounted on a planar surface or hung on a wall, etc.

The display devices of the present invention are original, inexpensive and attractive. The impression created has a three-dimensional effect, as will be made clear hereinafter.

In accordance with the present invention, the display device includes a rear opaque member telescopically coupled to a transparent front member. Indicia is provided on each member. Preferably the indicia is provided on the inner surface of the transparent front member. The indicia provided on the rear member is visible through the transparent front member. The respective indicia are preferably coordinated or compatible with one another.

In accordance with another embodiment of the present invention, a dispenser housing is provided containing the above-mentioned display device. The housing is substantially larger than the display device so as to provide compartment within which articles to be dispensed may be supported. The nature of the indicia is preferably directed to the articles to be dispensed for promoting the same.

It is an object of the present invention to provide a novel display device which is attractive in appearance and versatile in use.

It is another object of the present invention to provide display devices which may be supported on planar surfaces as well as mounted on a wall.

It is another object of the present invention to provide display devices which are inexpensive and lend themselves to a versatile form of advertising for promoting.

It is another object of the present invention to provide display devices which present a three-dimensional effect by superimposing indicia on one member over indicia on the other member with both indicia being visible from one side of the display device.

It is another object of the present invention to provide a display device mounted within a dispenser housing so that the articles to be dispensed may be simultaneously promoted by the unusual effects which can be attained by the present invention.

Other objects will appear hereinafter.

For the purpose of illustrating the invention there is shown in the drawings forms which are presently preferred; it being understood, however, that this invention is not limited to the precise arrangements and instrumentalities shown.

FIGURE 5 is a front perspective view of another embodiment of the present invention wherein the display device is supported within a dispenser housing;

FIGURE 6 is a sectional view taken along the line 6—6 in FIGURE 5;

FIGURE 7 is a sectional view taken along the line 7—7 in FIGURE 5;

FIGURE 8 is another embodiment of the present invention wherein a display device is incorporated within a dispensing housing;

FIGURE 9 is a sectional view taken along the line 9—9 in FIGURE 8.

Figure 1:
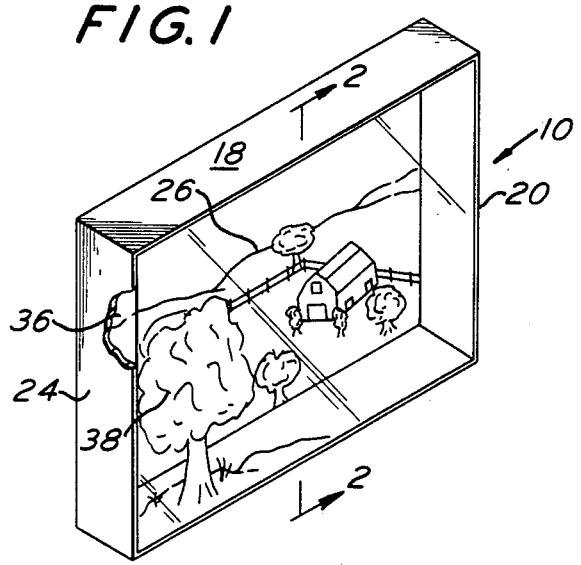
FIGURE 1 is a front perspective view of one embodiment of a display device constructed in accordance with the principles of the present invention.
Figure 2:
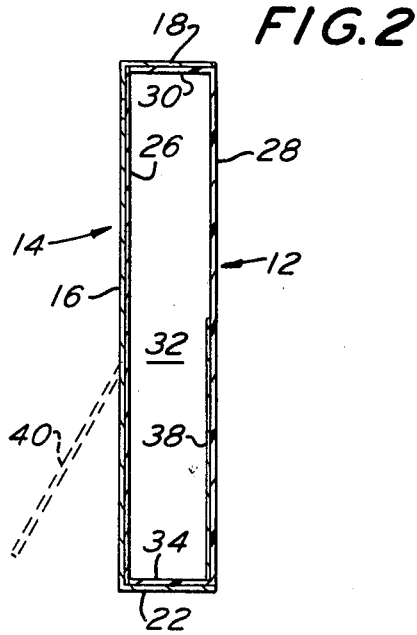
FIGURE 2 is a sectional view taken along the line 2—2 in FIGURE 1.

Referring now to the drawings in detail, wherein like numerals indicate like elements, there is shown in FIGURE 1 a display device in accordance with the present invention designated generally as 10. The display device 10 includes a transparent front member 12 and an opaque rear member 14.

The rear member 14 includes a rear face 16 which is planar and having upstanding peripheral side walls 18, 20, 22 and 24 integral therewith. Rear member 14 may be made from cardboard or paper having an attractive outer coating or layer. A layer 26 is secured to the inner surface of rear face 16 in a convenient manner such as by use of adhesive. Layer 26 has indicia thereon which is visible through the transparent front member 12. As shown more clearly in FIGURE 1, the indicia on layer 26 is illustrated as being a barnyard scene.

The front member 12 is preferably made from transparent plastics, such as cellophane, vinyls, acetates, etc. The front member 12 includes a planar front face 28 having side walls 30, 32, 34 and 36 integral therewith. A layer 38 is applied to the front face 28. Layer 38 is preferably applied to the inner surface of front face 28 by printing the same. It would be within the scope of the present invention to adhesively paste the layer 38 to the front face 28.

Layer 38 preferably has indicia thereon which is compatible or related to the indicia on layer 26. As shown more clearly in FIGURE 1, the indicia on layer 38 is a tree forming a part of the barnyard scene. By having indicia on the front and rear members, a three-dimensional effect is attained.

It will be appreciated that the indicia on layers 26 and 38 appearing in FIGURE 1 are for purposes of illustration only. A commercial adaptation of this principle can assume a wide variety of forms. For example, a plurality of display devices 10 can be provided with the identical indicia on layer 26. However, the indicia on layer 38 will vary and be different on each of the display devices 10. For example, the indicia on layer 26 may be a scene of a room in a home. The indicia on layer 38 may be a rug of a particular color. The effect of changing the color for the rug may be obtained by using a different color on the various display devices 10.

The size and configuration of the front member 12 is slightly smaller than that of the rear member 14. The front and rear members 12 and 14 are telescopically coupled together by a friction fit. If desired, adhesive may be applied to two or more of the side walls on the members. By putting the layer 38 on the inner surface of front face 28 it is less likely to be marred or scratched during handling. The display device may be supported on any planar surface. If desired, the rear face 16 may have an easel 40 integral therewith at one end so as to provide a more stable supporting of the display device 10. If it is desired to support the display device 10 on a wall, an aperture may be provided in the rear face 16 to facilitate hanging the same. Alternatively, adhesive cloth picture hangers are commercially available wherein the picture hanger would be adhesively coupled to the rear face 16 to facilitate hanging the same.

Figure 3:
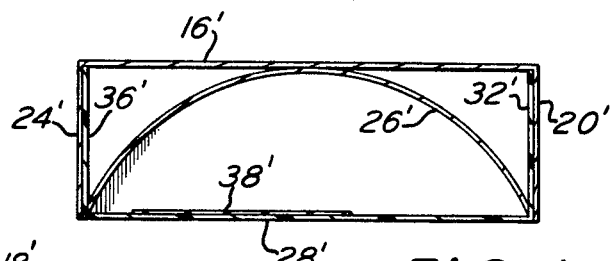
FIGURE 3 is a front perspective view of another embodiment of a display device constructed in accordance with the principles of the present invention and particularly adapted for solicitation of funds.
Figure 4:
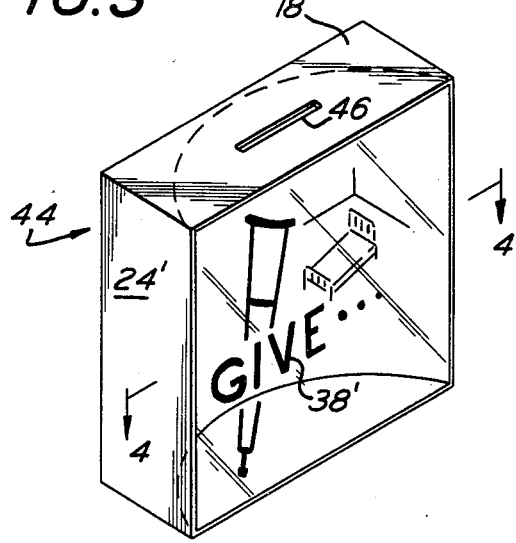
FIGURE 4 is a sectional view taken along the line 4—4 in FIGURE 3.

In FIGURES 3 and 4, there is illustrated another embodiment of the display device of the present invention designated generally as 44. Display device 44 is identical with the display device 10, except that it will be described hereinafter. Hence, corresponding structure is provided with corresponding primed numerals.

The display device 44 has a die-cut opening 46 in the wall 18' so that it may be used for soliciting and collecting funds. The indicia on the inner surface of the front face 28' may be in the form of a crutch and the word "Give" while the indicia on the layer 26' depicts a hospital scene. As illustrated, the layer 26' is concave with its free ends extending to the corners between the front face 28' and side walls integral therewith. The rest of the layer 26' may be adhesively bonded to the rear face 16' if desired. In addition to being able to see the indicia on the front and rear members through the front member, the money collected is also visible through the front face 28' on the front member.

In FIGURES 5 and 6 where is illustrated another embodiment of the present invention designated generally as 50. A topless dispenser housing 52 made from heavy paper covered with an attractive outer layer is provided. housing 52 has a rear face 54 integral with side wall 56, 58, 60 and 62. A display device designated as 64 is received within the housing 52.

Display device 64 is identical in all respects with display device 10, except for the indicia. As illustrated in FIG. 5, the indicia on the inner surface of the front member is a representation of a safety razor while the indicia on the rear member is an advertisement for shaving cream. These representations are for purposes of illustration only. Preferably, the display device 64 is substantially smaller in configuration with respect to the housing 52 so as to leave at least one compartment 66. The depth of the housing 52 and display device 64 are perfectly identical as will be apparent from FIGURES 6 and 7.

The display device 64 has a height corresponding to the height of housing 52. Display device 64 is retained within housing 52 in a convenient manner such as by a forced fit or by adhesively bonding the rear member of the display device 64 to the rear face 54.

The compartment 66 is intended to house articles to be dispensed. The compartment 66 is covered with a transparent front member 68 having integral side walls 70, 72, 74 and 76. Member 68 is made from the same material as member 12 described above. Member 68 is telescopically received between device 64 and three of the side walls of housing 52. If desired, the side walls on member 68 may be provided with a forced fit in the housing 52 or adhesively joined to the side walls of the housing 52.

The front member 68 is provided with a cut-out portion 78 adjacent to the bottom thereof so that articles 82 may be dispensed therethrough. A wall 80 having a curved bottom portion is fixedly secured to the rear face 54 of the housing 52 within compartment 66.

As illustrated in FIGURE 5, compartments for articles to be dispensed may be provided on opposite sides of the device 64. The indicia on the front and rear members of the display device 64 being related to razors and shaving cream, the articles 82 may be razor blades thereby providing a compatible related promotional display device. Where the housing 52 is shallow, an easel may be provided by die-cutting the same out of the rear face 54.

In FIGURES 8 and 9, there is illustrated another embodiment of the present invention similar to that shown in FIGURES 5–7. The embodiment 86 as shown in FIGURES 8 and 9 is identical with the embodiment 50, except as will be explained hereinafter. Hence, corresponding elements are provided with corresponding primed numerals in FIGURES 8 and 9.

The display device 88 is telescopically received within the housing 52' and may be fixedly retained therein as described above in connection with FIGURES 5–7. Display device 88 is smaller than the housing 52' so as to define a compartment therebelow within which articles to be dispensed are stored.

For purposes of illustration, the embodiment shown in FIGURE 8 can be utilized wherein the articles 90 are packs of cigarettes. The indicia on the front and rear members of display device 88 are related to cigarettes and a scene comparable therewith.

In each of the embodiments of the present invention, the display devices are simple, attractive and versatile, while being light in weight and inexpensive.

While the illustrations and the above description present the invention as being an advertising device, it will be appreciated by those skilled in the art that the subject invention could be utilized as a form of art wherein the indicia may be montages.

As used here and after, the word "indicia" is intended to cover words, pictures and/or a combination of the two.

The present invention may be embodied in other specific forms without departing from the spirit or essential attributes thereof and, accordingly, reference should be made to the appended claims rather than to the foregoing specification as indicating the scope of the invention.

We claim:

1. A display device comprising an opaque rear member and a transparent front member, said front member having side walls telescopically coupled to the side walls on said rear member so as to define a chamber therebetween, indicia on only a portion of said transparent front member, and indicia in said chamber on said rear member so that it can be visible through the remaining portion of said front member.

2. A display device in accordance with claim 1 wherein said members are rectangular, said rear member being made of paper, and said front member being a transparent plastic.

3. A display device in accordance with claim 1 including an opening in a side wall of said rear member aligned with an opening in a side wall of said front member so that coins may be inserted into said chamber.

4. A device in accordance with claim 1 wherein the height of the side walls of said front member are substantially equal to the height of the side walls on said rear member, an indicia on said front member being on the surface thereof exposed to said chamber.

5. A device in accordance with claim 1 including a dispenser housing larger than said members, said members being supported in said housing, and at least one dispenser compartment in said housing adjacent said members within which articles to be dispensed may be stored.

6. A device in accordance with claim 5 including a transparent plastic member overlying the compartment and telescopically received within said housing.

7. A promotional device comprising a dispenser housing made from paper having a rear face provided with side walls at its periphery, a display device received within said housing and occupying less than the area defined by said walls, said display device including an opaque rear member and a transparent plastic front member, said front and rear members having walls telescopically coupled together so as to define a chamber therebetween, indicia on only a portion of the inner surface of said transparent front member, and indicia on said rear member visible through the remainder of said front member.

References Cited

UNITED STATES PATENTS

| | | | |
|---|---|---|---|
| 2,105,008 | 1/1938 | Riley | 40—135 X |
| 2,209,657 | 7/1940 | Martin | 40—312 |
| 2,305,890 | 12/1942 | Moore | 40—135 |
| 3,057,099 | 10/1962 | Fruchter | 40—160 |
| 3,333,358 | 8/1967 | Green et al. | 40—160 |

EUGENE R. CAPOZIO, Primary Examiner

W. J. CONTRERAS, Assistant Examiner

U.S. Cl. X.R.

40—160